United States Patent
Schmidt

(10) Patent No.: US 6,990,742 B1
(45) Date of Patent: Jan. 31, 2006

(54) WAVE LEVEL

(75) Inventor: Sheldon Schmidt, Paramus, NJ (US)

(73) Assignee: Great Neck Saw Manufacturers, Inc., Mineola, NY (US)

( * ) Notice: Subject to any disclaimer, the term of this patent is extended or adjusted under 35 U.S.C. 154(b) by 30 days.

(21) Appl. No.: 10/828,588

(22) Filed: Apr. 22, 2004

(51) Int. Cl.
*G01C 9/20* (2006.01)

(52) U.S. Cl. .............................. 33/377; 33/379; 33/384; 33/390

(58) Field of Classification Search .................. 33/377, 33/379–384, 389–390, 365, 451; D10/69
See application file for complete search history.

(56) References Cited

U.S. PATENT DOCUMENTS

| | | |
|---|---|---|
| 25,446 A | 9/1859 | Scoville |
| 257,515 A | 5/1882 | Pope |
| 591,139 A | 10/1897 | Morton |
| 613,946 A | 11/1898 | Starrett |
| 817,515 A | 4/1906 | Polimeni |
| 1,205,956 A * | 11/1916 | Adkins ......................... 33/384 |
| 1,274,333 A | 7/1918 | Roland |
| 1,298,010 A * | 3/1919 | Coleman ..................... 33/451 |
| 1,303,829 A | 5/1919 | Vogel |
| 1,308,765 A | 7/1919 | Powell |
| 1,777,429 A | 10/1930 | Charlton |
| 1,898,367 A * | 2/1933 | Heinze ......................... 33/390 |
| 2,084,053 A | 6/1937 | Wilson |
| 2,453,091 A * | 11/1948 | Holloway et al. ............ 33/384 |
| 2,525,387 A * | 10/1950 | Volk ............................. 33/370 |
| 2,551,524 A | 5/1951 | Bullivant |
| 2,566,542 A | 9/1951 | Vaida |
| 2,584,917 A | 2/1952 | Powell |
| 3,328,887 A | 7/1967 | Wright |
| 3,385,258 A * | 5/1968 | Curtin et al. ................. 33/348 |
| 3,593,428 A * | 7/1971 | Jacoff ........................... 33/379 |
| 4,011,660 A | 3/1977 | Johnson |
| 4,532,718 A * | 8/1985 | Copeland ..................... 33/390 |
| D326,420 S | 5/1992 | Reitano |
| 5,111,369 A * | 5/1992 | Shirai et al. ................ 362/462 |
| 5,269,066 A | 12/1993 | Walters |
| 5,279,040 A | 1/1994 | Kippelt et al. |
| 5,279,041 A | 1/1994 | Wright |
| 5,392,112 A | 2/1995 | Nakamura |
| 5,425,179 A | 6/1995 | Nickel et al. |
| 5,442,864 A | 8/1995 | Erman |
| 5,463,817 A | 11/1995 | Leeds |
| 5,749,152 A * | 5/1998 | Goss et al. ................... 33/381 |
| 5,940,978 A | 8/1999 | Wright et al. |
| 6,041,510 A | 3/2000 | Huff |
| 6,237,237 B1 | 5/2001 | Mc Kenna et al. |
| 6,293,023 B1 | 9/2001 | Schooley |
| 6,381,859 B1 | 5/2002 | Wedemeyer |
| 6,572,073 B2 | 6/2003 | Jacoff |
| 6,735,880 B1 * | 5/2004 | Jacoff ........................... 33/379 |

* cited by examiner

*Primary Examiner*—Christopher W. Fulton
*Assistant Examiner*—Tania Courson
(74) *Attorney, Agent, or Firm*—Joseph J. Previto

(57) ABSTRACT

A level having a frame with an edge rail and a web extending from the edge rail at right angles. A web opening is provided in the web. A capsule assembly is mounted on the web at the web opening. The capsule assembly has a transparent capsule having a liquid therein and outer cover plates mounted over the capsule on each side of the web. The volume of the liquid in the capsule is less then the volume of the interior of the capsule so that an upper surface of the liquid is formed in the entire surface of which is viewable through the transparent capsule.

1 Claim, 3 Drawing Sheets

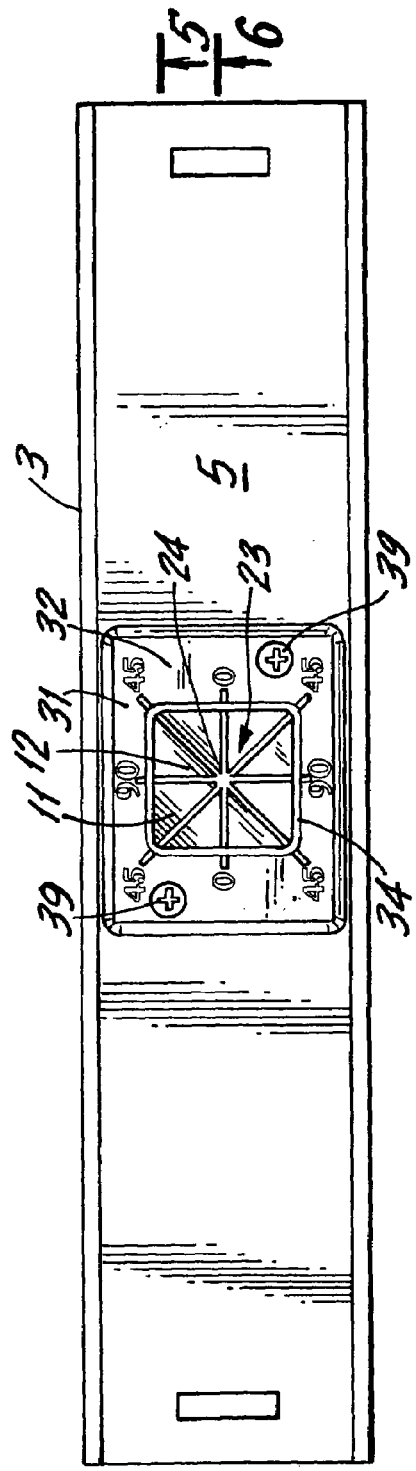
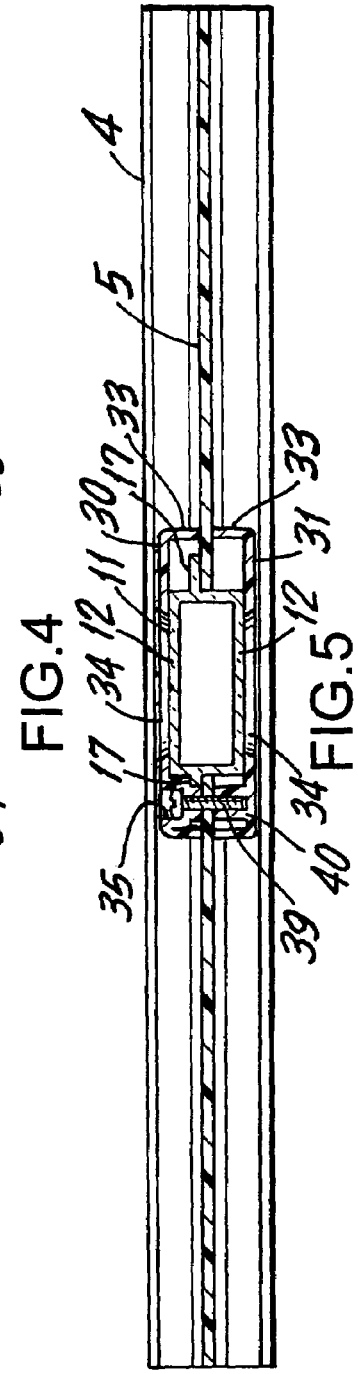
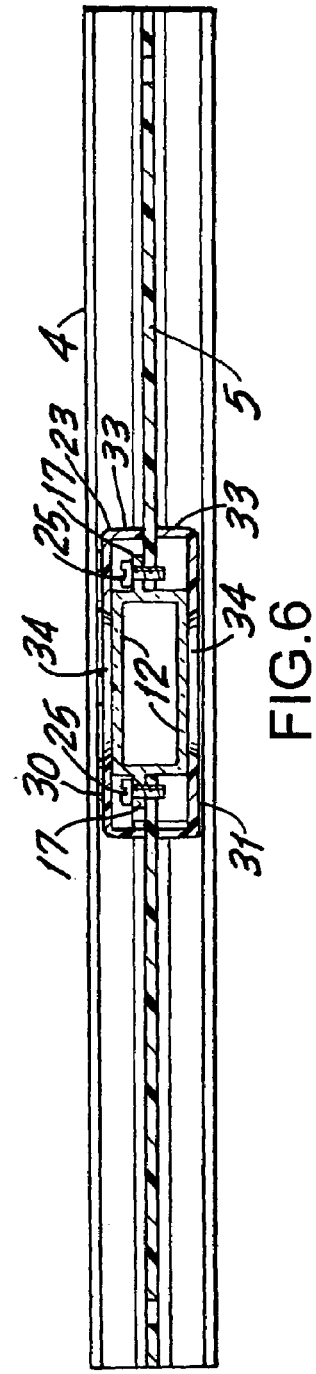

WAVE LEVEL

BACKGROUND

The present invention relates to a level and more particularly to a wave level for measuring the level of a straight surface.

Wave levels have been used for a number of years. They differ from vial levels in that in general, a vial level uses a small cylindrical transparent curved vial with a liquid therein. The vial is not completely filled with liquid so that a small air bubble is formed in the vial. When testing the level of a surface, the position of the air bubble within the vial determines whether a particular surface is level or inclined. In a wave level, the liquid is contained in a large transparent capsule which may be square or rectangular. The liquid in the capsule does not fill the capsule so that the entire upper surface of the liquid is exposed and visible through the transparent capsule. The angle of the liquid surface determines whether the wave level is on a level or tilted surface.

OBJECTS

The present invention has for one of its objects the provision of an improved wave level.

Another object of the present invention is the provision of an improved wave level which can be easily assembled.

Another object of the present invention is the provision of an improved wave level in which the capsule may be easily and accurately mounted on the level frame.

Another object of the present invention is the provision of an improved wave level which is simple to use.

Another object of the present invention is the provision of an improved wave level which is simple and inexpensive to manufacture.

Other and further objects of the invention will be obvious upon an understanding of the illustrative embodiment about to described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein:

FIG. 4 is a side plan view of the wave level.

FIG. 5 is a sectional view taken along 5—5 of FIG. 4.

FIG. 6 is a sectional view taken along line 6—6 of FIG. 4.

DESCRIPTION

Figure 1:
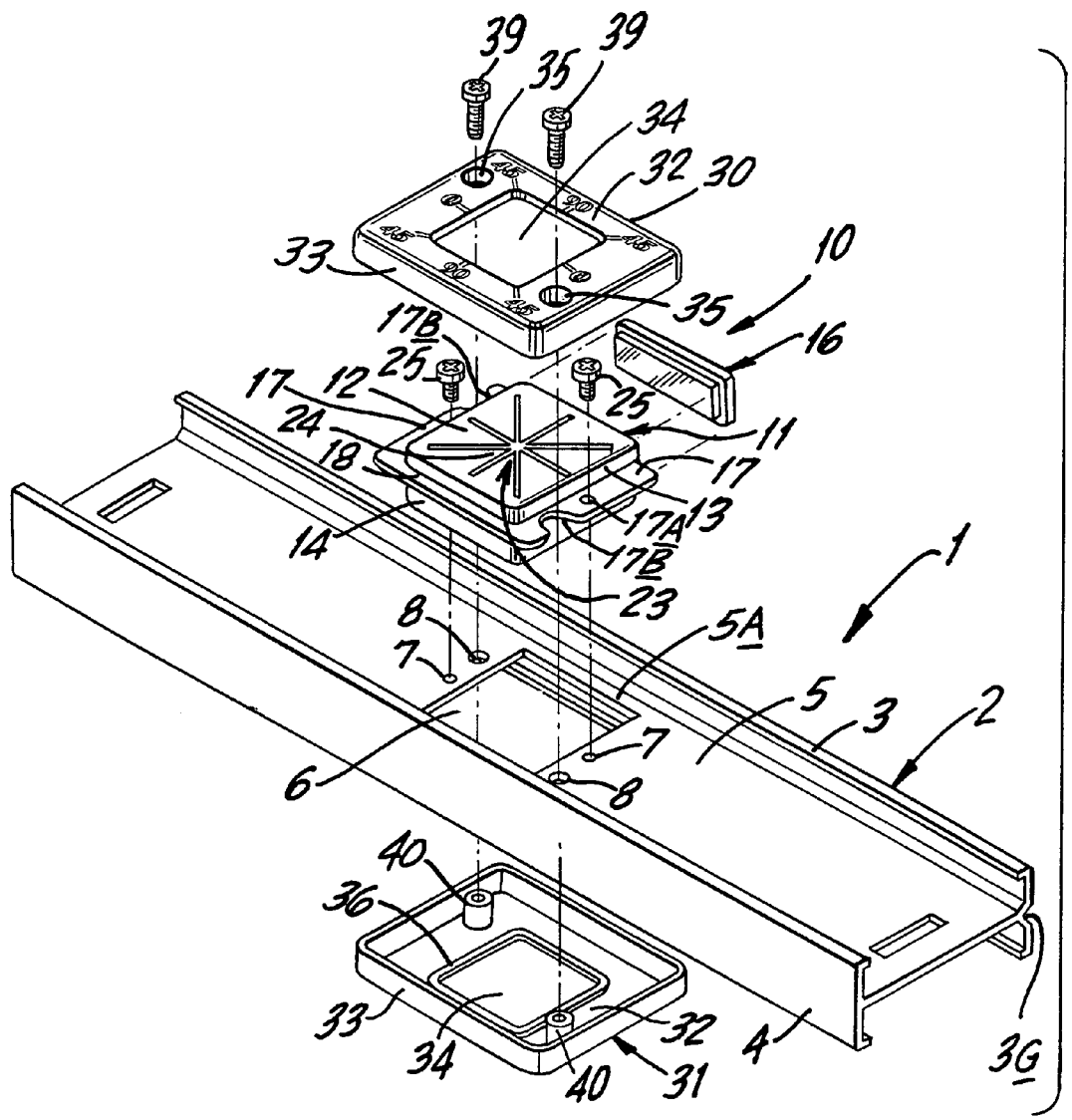
FIG. 1 is an exploded perspective view of a wave level embodying the present invention.
Figure 2:
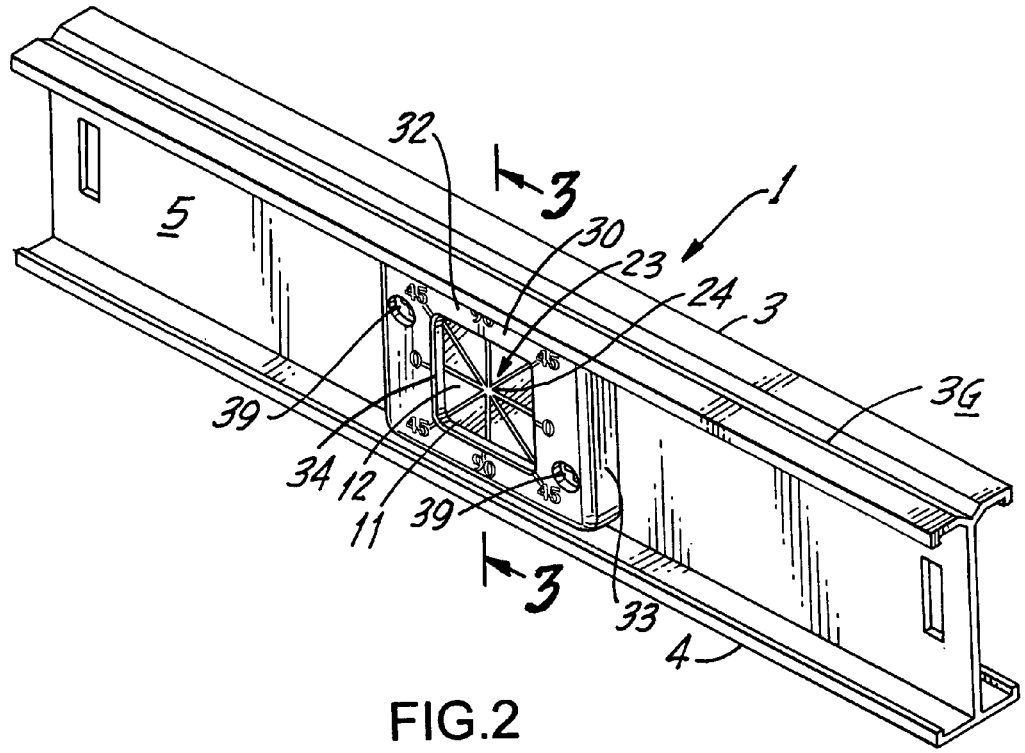
FIG. 2 is a perspective view of the assembled wave level of the present invention.
Figure 7:
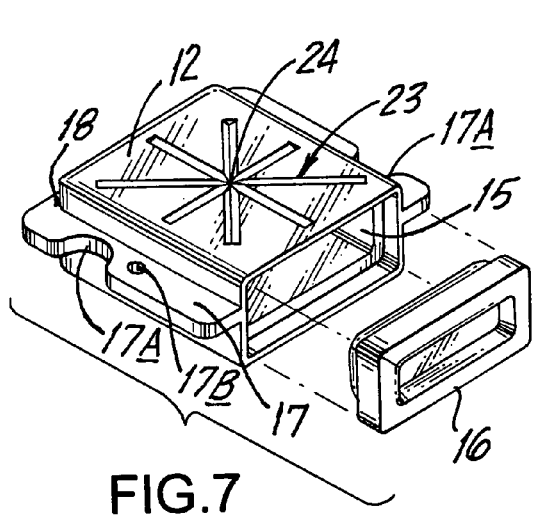
FIG. 7 is an exploded perspective view of the liquid containing capsule used in the present invention.
Figure 3:
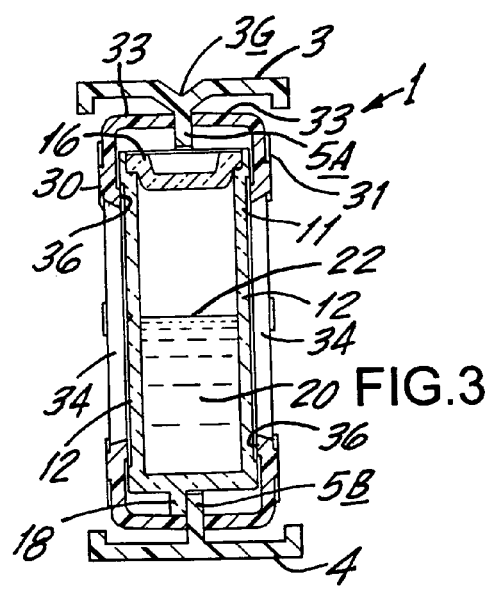
FIG. 3 is a sectional view taken along line 3—3 of FIG. 2.

Referring to the drawings, the wave level 1 of the present invention comprises a frame 2 having upper and lower edge rails 3 and 4, respectfully, connected together by a web 5 which is at right angles to the edge rails 3 and 4. The upper edge rail 3 may have a groove 3G therein. The frame 2 may be made of aluminum or some other suitable material. The frame 2 has a web opening 6 which, in the drawing, is shown as being square but which may be of a different shape, such as rectangular, if desired. The web opening 6 is preferably located between and slightly spaced from the edge rails 3 and 4 so as to leave upper and lower web portions 5A and 5B, respectively, above and below the web opening 6. Threaded holes 7 and openings 8 are provided on the web 5 adjacent to and on opposite sides of the web 5.

A capsule assembly 10 is adopted to be mounted at the web opening 6. The capsule assembly 10 comprises a capsule 11 and a pair of outer cover plates 30 and 31. The capsule 11 comprises a pair of side walls 12 connected together by end walls 13 and bottom wall 14 with an open top 15 adopted to be closed by a cover 16. The capsule 11 is shown as being preferably square and its side walls 12 are shown as being preferably flat and parallel to each other with the end walls 13 and the bottom wall 14 at right angles thereto. However, it will be understood that the capsule 11 may be a different shape and the side walls 12 need not be flat, without departing from the invention. The end walls 13 and bottom wall 14 have end flanges 17 and butt-on flange 18, respectively, extending at right angles therefrom. Each of the end flanges 17 have openings 17A and notches 17 B therein. Preferably, the capsule 11 may be molded in a single piece or may be made of multiple pieces which are adhered together. Preferably the capsule 11 may be made of a transparent plastic material, but other transparent materials may also be used, if desired. The capsule side walls 12 may preferably be provided with a plurality of reference lines 23 which may comprise a line parallel to and/or a line perpendicular to and/or a line at an angle to the edge rails 3 and 4 of the frame 2 all of which intersect at a juncture 24 which is preferably at the center of the side walls 12. However, it will be understood that the reference lines 23 may be at different angles and different levels if desired. The capsule 11 has its open top 15 closed by the cover 16 which may be sealed thereto by an adhesive or by some other suitable means. A suitable liquid 20 is provided within the capsule 11. The liquid 20 does not completely fill the capsule 11 thereby leaving an air space 21 above the liquid and a surface 22 spaced below the cover 16. Preferably the surface 22 of the liquid 20 is at the same level as the juncture 24 of the reference lines 23.

The capsule 11 is attached to the web 5 at the web opening 6 by means of screws 25 extending through the openings 17A in the end flanges 17 and threaded into the web 5 at threaded holes 7. The bottom flange 18 bears against the lower web portion 5B and the upper web portion 5A bears down on the cover 16 of the capsule 11 from the top.

The outer cover plate 30 of the capsule assembly 10 comprises a front face 32 having openings 35 therein and a peripheral wall 33 extending inwardly at right angles to the front face 32. A window 34 is provided in the front face 32 with the inner edge of the window 34 having a slightly raised inwardly extending peripheral ridge 36 which is adapted to bear against the side walls 12 of the capsule 11 when assembled.

The outer cover plate 31 is substantially identical to the outer cover plate 30 with the same parts being identified by the same reference numbers. However, instead of having openings in its front face 32, the inner surface of the front face 32 it is provided with inwardly extending threaded projections 40.

After the capsule assembly 10 has been assembled on the web 5 at the web opening 6 as set forth above, the outer cover plates 30 and 31 are mounted over the capsule 11 on each side of the web 5. The outer cover plates 30 and 31 are held to each other by screws 39 which pass through openings 35 in the front face 32 of the outer cover plate 30, through the notches 17B in the end flanges 17 and are threaded into the inwardly extending threaded projections 40 in the other cover 31. The peripheral wall 33 of each cover plate 30 and 31 bears against the web 5 on each side of the web opening 6 and underlies the bottom flange 18 of the capsule 11 which rests on the inner surface of the peripheral wall 33 of the outer cover plate 30. The inwardly extending ridges 36 of the cover plates 30 and 31 bear against the side walls 12 of the capsule 11 on each side of the capsule 11.

To determine whether a particular surface is level or tilted, am edge rail (3 or 4) of the level frame 2 is placed against the surface and the angle of the surface 22 of the liquid 20 is examined. If the surface 22 is parallel to or at the same level as the parallel reference line of the reference lines 23 (or to the edge rails 3 or 4), the examined surface is level. However, if the surface 22 of the liquid 20 is at an angle to the parallel reference line of the surface line 23 (or to the edge rails 3 or 4), then the surface is not level. The other reference lines 23 may alert the user as to how far from a level surface the tested surface actually is.

It will thus be seen the present invention provides an improved wave level which can be easily assembled in which the capsule may be easily and mounted accurately on the web of the level frame, which is simple to use and which is simple and inexpensive to manufacture.

As many and varied modifications of the subject matter of this invention will become apparent to those skilled in the art from the detailed description given hereinabove, it will be understood that the present invention is limited only as provided in the claims appended hereto.

What is claimed is:

1. A level comprising a frame having an edge rail and a web extending from said edge rail at right angles thereto, said edge rail being wider than the thickness of said web, a web opening in said web, a capsule assembly mounted on said web at said web opening, said capsule assembly comprising a transparent capsule having a liquid therein and outer cover plates mounted over said capsule on each side of said web, the volume of the liquid in said capsule being less than the volume of the interior of said capsule whereby an upper surface of said liquid is formed the entire surface of which is viewable through the transparent capsule, said capsule comprises opposed flat side walls parallel to each other, opposed end walls parallel to each other and at right angles to said side walls, a bottom wall at right angles to said end walls, said side walls and said bottom wall, an open top opposite said bottom wall the width of said bottom wall being less than the width of said side walls, a flat cover removably mounted in said open top to close the open top, said flat cover being parallel to said bottom wall when mounted in said open top, an end flange extending from each of said end walls, said end flanges abutting against the said web, fastening means adapted to fasten the end flanges to the web, said fastening means extending through said end flange and into said web, said bottom wall having a bottom flange extending therefrom, said bottom flange abutting said web, said side walls having reference line markings thereon, said outer cover plates being affixed to each other from opposed sides of said web, said outer cover plates comprise a front face having a window through which said capsule may be seen and a peripheral wall extending from said front face and adapted to bear against said web adjacent to the capsule, a notch provided in the end flanges of the capsule, a fastening member extending from the front face of one of the outer cover plates, through said notch and into the front face of the outer cover plate, said window in each of said cover plates having a peripheral ridge extending inwardly and adapted to abut against the entire flat, side walls of the capsule on either side thereof.

* * * * *